United States Patent [19]
Hayashi et al.

[11] Patent Number: 5,472,996
[45] Date of Patent: Dec. 5, 1995

[54] AQUEOUS DISPERSED RESIN COMPOSITION

[75] Inventors: Ryutaro Hayashi; Masahiro Aoki; Toyoji Tomita; Yoshinori Kato; Takeo Tsukamoto; Takeshi Awata, all of Mie, Japan

[73] Assignee: Mitsubishi Yuka Badische Co., Ltd., Yokkaichi, Japan

[21] Appl. No.: 224,521

[22] Filed: Apr. 7, 1994

[30] Foreign Application Priority Data

Apr. 7, 1993 [JP] Japan ................... 5-080532

[51] Int. Cl.$^6$ ................ C08L 51/00; C08F 8/30
[52] U.S. Cl. ............ 523/201; 524/535; 524/804; 524/812; 524/831; 525/376; 525/902
[58] Field of Search ................ 525/376, 377, 525/301, 902; 524/714, 504, 812, 535, 831; 523/201

[56] References Cited

U.S. PATENT DOCUMENTS

| | | | |
|---|---|---|---|
| 4,959,428 | 9/1990 | Abe et al. ................ | 526/201 |
| 4,988,762 | 1/1991 | Overbeek et al. ........ | 524/839 |
| 5,308,890 | 5/1994 | Snyder ..................... | 523/201 |

FOREIGN PATENT DOCUMENTS

| | | |
|---|---|---|
| 0151360 | 8/1985 | European Pat. Off. . |
| 0296487 | 12/1988 | European Pat. Off. . |
| 0458144 | 11/1991 | European Pat. Off. . |
| 0555959 | 8/1993 | European Pat. Off. . |

*Primary Examiner*—Tae H. Yoon
*Attorney, Agent, or Firm*—Oblon, Spivak, McClelland, Maier, & Neustadt

[57] ABSTRACT

An aqueous dispersed resin composition comprising (A) an aqueous dispersion of carbonyl-containing resin particles having an inner layer and an outermost layer, which is obtained by emulsion polymerization of a monomer mixture comprising (a) not less than 0.5% by weight of a carbonyl-containing monomer containing at least one aldo group or keto group and one polymerizable unsaturated double bond in the molecule thereof, (b) not less than 0.5% by weight of an ethylenically unsaturated carboxylic acid, (c) not more than 99% by weight of a monomer having a water-solubility of not more than 8 g/100 ml at 20° C., and (d) not more than 99% by weight of an unsaturated monomer other than the monomers (a) to (c) in the presence of dispersed resin particles serving as an inner layer and (B) a hydrophilic compound comprising a hydrazine derivative containing at least two hydrazino groups in the molecule thereof, in which the resin constituting the outermost layer of the carbonyl-containing resin particles has a degree of solubilization of at least 5% by weight, and the resin constituting the inner layer has a degree of solubilization lower than that of the resin constituting the outermost layer. The composition provides a film excellent in water resistance, adhesion to a substrate, smoothness, gloss, and resistance to whitening on contact with water.

15 Claims, No Drawings

AQUEOUS DISPERSED RESIN COMPOSITION

FIELD OF THE INVENTION

This invention relates to an aqueous dispersed resin composition ready to undergo crosslinking at room temperature on evaporation of water without any special means, such as heat, ultraviolet rays or radiation to provide a glossy film excellent in water resistance, solvent resistance and adhesion to a substrate. The composition of the present invention is useful as coating compounds for various substrates, such as wood, metal, paper, plastics and slate, printing inks, adhesives and textile assistants. Having excellent resistance to whitening on contact with .water, the composition is particularly advantageous as a binder for stone finishing compounds using fine color stone particles.

BACKGROUND OF THE INVENTION

Aqueous resin dispersions are widely employed as coatings, adhesives and textile assistants. From the standpoint of environmental conservation and workability, aqueous resin dispersions have been replacing solvent-type resin compositions.

However, containing polymers having a molecular weight as high as 500,000 to 1,000,000 in a particulate form, the conventional aqueous resin dispersions have insufficient fluidity for obtaining sufficient penetrability into a substrate and sufficient adhesion to a substrate. Additionally, a coating film having a smooth surface cannot be obtained.

In order to overcome these disadvantages, reduction of resin particles in size to prepare a so-called microemulsion or addition of a water-soluble resin has been attempted. However, reduction of dispersed particle size of an emulsion requires a large quantity of an emulsifying agent, which leads to reduction of the water resistance of the resulting film. Addition of a water-soluble resin also results in reduction in water resistance of a film to an impractical level.

An aqueous dispersion of a carbonyl-containing copolymer resin which contains a hydrazine derivative is known to provide a film having excellent water resistance, solvent resistance and hardness (see U.S. Pat. Nos. 4,267,091, 4,210,565, 5,208,282 and 4,959,428 and JP-B-1-13501 (the term "JP-B" as used herein means an "examined published Japanese patent application")). Nevertheless, the proposed aqueous resin dispersion is still inferior in adhesion to a substrate and surface smoothness of a film because the polymer exists in a particulate form.

SUMMARY OF THE INVENTION

An object of the present invention is to provide an aqueous dispersed resin composition which provides a film excellent in water resistance, adhesion to a substrate, surface smoothness, gloss, and resistance to whitening on contact with water.

As a result of extensive investigations, the present inventors have found that the above object of the present invention is accomplished by a combination of (A) an aqueous dispersed carbonyl-containing resin composition in which resin particles have an inner layer and an outermost layer and at least the outermost layer contains a carbonyl group, the inner and outermost layers having specific degree of solubilization, and (B) a hydrophilic compound comprising a hydrazine derivative and completed the present invention based on this finding.

The present invention relates to an aqueous dispersed resin composition comprising (A) an aqueous dispersion of carbonyl-containing resin particles having an inner layer and an outermost layer, which is obtained by emulsion polymerization of a monomer mixture comprising (a) not less than 0.5% by weight of a carbonyl-containing monomer containing at least one aldo group or keto group and one polymerizable unsaturated double bond in the molecule thereof, (b) not less than 0.5% by weight of an ethylenically unsaturated carboxylic acid, (c) not more than 99% by weight of a monomer having a water-solubility of not more than 8 g/100 ml at 20° C., and (d) not more than 99% by weight of an unsaturated monomer other than the monomers (a) to (c) in the presence of dispersed resin particles serving as an inner layer and (B) a hydrophilic compound comprising a hydrazine derivative containing at least two hydrazino groups in the molecule thereof, in which the resin constituting the outermost layer of the carbonyl-containing resin particles has a degree of solubilization of at least 5% by weight, and the resin constituting the inner layer has a degree of solubilization lower than that of the resin constituting the outermost layer.

DETAILED DESCRIPTION OF THE INVENTION

In the present invention, where resin particles in aqueous dispersion (A) has three or more layers, layers other than the outermost layer will be called "inner layers".

In order to achieve improvements in various physical properties by solubilization in good balance with water resistance, the resin constituting the outermost layer of carbonyl-containing resin particles of aqueous dispersion (A) is prepared from a monomer mixture comprising (a) a carbonyl-containing monomer containing at least one aldo group or keto group and one polymerizable unsaturated double bond in the molecule thereof and (b) an ethylenically unsaturated carboxylic acid, and if desired, (c) a monomer having a water-solubility of not more than 8 g/100 ml at 20° C. and (d) other unsaturated monomers. The combination of monomers (a) to (d) is also preferred as the resin constituting the inner layer(s) of the resin particles.

Monomer (a) which can be used for preparing aqueous resin dispersion (A) includes acrolein, diacetone acrylamide, formylstyrol, a vinyl alkyl ketone having 4 to 7 carbon atoms (e.g., vinyl methyl ketone, vinyl ethyl ketone or vinyl butyl ketone), diacetone acrylate, acetonyl acrylate, diacetone methacrylate, 2-hydroxypropyl acrylate acetylacetate, 1,4-butanediol acrylate acetylacetate, and a (meth)acryloxyalkylpropenal represented by formula:

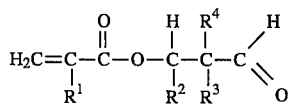

wherein $R^1$ represents a hydrogen atom or a methyl group; $R^2$ represents a hydrogen atom or an alkyl group having from 1 to 3 carbon atoms; $R^3$ represents an alkyl group having from 1 to 3 carbon atoms; and $R^4$ represents an alkyl group having from 1 to 4 carbon atoms. Preferred monomers (a) are diacetone acrylamide, acrolein, and vinyl methyl ketone. These monomers may be used either individually or in combination of two or more thereof.

Monomer (a) is essential for the outermost layer of the resin particles. It is preferred from the standpoint of water resistance of a film that monomer (a) is present in both the outermost and inner layer(s). Monomer (a) in the outermost layer should be used in an amount of not less than 0.5% by weight, preferably from 2 to 20% by weight, based on the total monomers constituting the outermost layer. If the amount of monomer (a) to be used in formation of the outermost layer is less than 0.5% by weight, hydrazine derivative-induced crosslinking does not proceed sufficiently, failing to obtain a desired improvement in water resistance. If it is too large, no further improvement in physical properties tends to be obtained, and the resulting film tends to be too brittle for practical use. Monomer (a) in the whole inner layer(s) is preferably used in an amount of not less than 0.5% by weight, more preferably from 1 to 15% by weight, based on the total monomers constituting the whole inner layer(s).

Monomer (b) which can be used for preparing aqueous resin dispersion (A) may be a monocarboxylic acid or a polycarboxylic acid and is preferably a mono- or diolefinic unsaturated carboxylic acid having from 3 to 5 carbon atoms and particularly acrylic acid, methacrylic acid or itaconic acid.

Monomer (b) in the outermost layer is used in an amount of not less than 0.5% by weight based on the total monomers constituting the outermost layer. If the proportion of monomer (b) in the outermost layer is too small, water solubilization by addition of an alkali and/or an organic solvent as hereinafter described cannot be effected sufficiently, resulting in a failure of obtaining a film having sufficient smoothness, adhesion to a substrate, gloss and resistance to whitening on contact with water. If the proportion of monomer (b) in the outermost layer is too large, the resulting film tends to have reduced water resistance and, as a result, deteriorate the adhesion to a substrate.

Monomer (b) in the whole layer(s) other than the outermost layer is preferably used in an amount of up to 2% by weight, more preferably from 0.5 to 1.8% by weight, based on the total monomers constituting the whole layer(s) other than the outermost layer. If the proportion of this monomer in the inner layer is too large, the water resistance of the resulting film tends to be reduced.

Where monomer (b) is used in an amount of from 0.5 to 5% by weight and particularly from 2 to 5% by weight, in the outermost layer, the polymerization of monomers is preferably conducted in the presence of a chain transfer agent. In general, a copolymer resin prepared by emulsion polymerization has a high molecular weight and is therefore hardly solubilized. Use of a chain transfer agent is effective to reduce the molecular weight of the copolymer produced thereby making solubilization easier. On the other hand, where the amount of monomer (b) in the outermost layer exceeds 5% by weight, preferably more than 5 and not more than 40% by weight, since solubilization of the resulting polymer is easier than in the above-mentioned case, a chain transfer agent is not essential. However, use of a chain transfer agent is also preferred in this case for ensuring the improvements in various physical properties. Chain transfer agents which can be used in the present invention include various mercaptan compounds, α-methylstyrene, alkyl halides, and alcohols. The chain transfer agent is usually used in an amount of from 0.03 to 5% by weight, preferably from 0.1 to 2% by weight, based on the total monomers.

Monomer (c) which may be used for preparing aqueous resin dispersion (A) is a monomer copolymerizable with monomers (a) and (b) and having a water solubility of not more than 8 g/100 ml at 20° C. Suitable monomers (c) include acrylic or methacrylic esters of saturated alkanols having 1 to 10 carbon atoms, such as methyl acrylate, methyl methacrylate, ethyl acrylate, butyl acrylate, butyl methacrylate, and 2-ethylhexyl acrylate; aromatic vinyl compounds, such as styrene; vinyl halides, such as vinyl chloride and vinylidene chloride; unsaturated hydrocarbons, such as ethylene and butadiene; vinyl esters, such as vinyl acetate and vinyl propionate; acrylonitrile, methacrylonitrile, and glycidyl methacrylate.

Monomer (c) in the outermost layer can be used in an amount up to 99% by weight, preferably from 30 to 99% by weight, more preferably from 55 to 96% by weight, particularly preferably from 55 to 93% by weight, based on the total monomers constituting the outermost layer. If the proportion of monomer (c) in the outermost layer is too small, the resulting film tends to have reduced water resistance or become brittle. If it is too large, the film tends to have reduced water resistance and reduced adhesion to a substrate.

It is preferable that monomer (c) in the whole layer(s) other than the outermost layer is used in an amount up to 99.5% by weight, more preferably from 83.2 to 98.5% by weight, based on the total monomers constituting the whole layer(s) other than the outermost layer. If the proportion of monomer (c) in the inner layer is too small, the resulting film tends to have reduced water resistance or become brittle.

Monomer (d) which may be used for preparing aqueous resin dispersion (A) is an unsaturated monomer other than monomers (a) to (c). Monomer (d) includes unsaturated amides, such as acrylamide and methacrylamide; hydroxyl-containing monomers, such as hydroxyethyl acrylate and hydroxypropyl acrylate; sulfonated monomers, such as vinylsulfonic acid, styrenesulfonic acid and salts thereof; and N-methylolacrylamide. Monomer (d) in the outermost layer constituting the resin particles can be used in an amount up to 99% by weight, preferably up to 69% by weight, more preferably up to 15% by weight, based on the total unsaturated monomers constituting the outermost layer. Monomer (d) in the whole layer(s) other than the outermost layer can be used in an amount up to 99% by weight, preferably up to 69% by weight, more preferably up to 15% by weight, based on the total unsaturated monomers constituting the whole layer(s) other than the outermost layer. If the proportion of monomer (d) in each layer exceeds the above-mentioned upper limit, the resin particles become excessively hydrophilic, tending to provide a film having reduced water resistance.

Aqueous resin dispersion (A) containing resin particles composed of at least two layers can be prepared by previously polymerizing a monomer mixture for an inner layer in water to prepare an emulsion and then adding a monomer mixture for the outermost layer to the emulsion, followed by emulsion polymerization.

Emulsion polymerization of a monomer mixture for each layer formation can be carried out by using a water-soluble polymerization initiator in combination with an emulsifying agent or by soap-free polymerization. Usable emulsifying agents include various anionic, cationic or nonionic emulsifying agents and high polymeric emulsifying agents. In particular, the carbonyl-containing high polymeric emulsifying agents disclosed in JP-A-64-48801 (corresponding to U.S. Pat. No. 4,959,428) are preferred.

Polymerization initiators which can be used in emulsion polymerization preferably include inorganic peroxides, such as potassium persulfate, ammonium persulfate, and hydrogen peroxide. These inorganic peroxides may be used in the form of a redox initiator in combination with a reducing agent.

In carrying out emulsion polymerization, monomers may be fed in various modes, including all-at-once addition, monomer addition, and emulsion addition. Seed polymerization, in which the composition of the monomer mixture to be fed is varied with time, or power feed polymerization may also be adopted. By using these methods, the resulting resin particles can have its copolymer composition varied between the central portion and the peripheral portion so that the degree of solubilization may be controlled.

The thus prepared aqueous resin dispersion (A) contains resin particles the outermost layer of which has been solubilized to a degree of at least 5% by weight, preferably not less than 30% by weight, by addition of an alkali and/or an organic solvent. The inner layer of the resin particles keeps its degree of solubilization at a level less than that of the outermost layer, preferably less than 5% by weight, despite the treatment with an alkali and/or an organic solvent.

It is preferable that the proportion of the outermost layer in the total resin particles is between 4 and 50% by weight, more preferably between 10 and 35% by weight. By controlling the outermost layer proportion as mentioned above, the degree of solubilization of the total particles preferably ranges from 6 to 50%, more preferably from 10 to 35%, while making the degree of solubilization of the outermost layer not less than 5% by weight and making the degree of solubilization of the inner layer less than that of the outermost layer.

If the degree of solubilization of the total particles is too small, the resulting film tends to have reduced adhesion to a substrate and reduced gloss. If it is too high, the film tends to have reduced water resistance.

Solubilization by addition of an alkali and/or an organic solvent may be conducted before the commencement of copolymerization for the preparation of aqueous resin dispersion (A) or during that copolymerization. In either case, the terminology "degree of solubilization" as used herein means a degree of solubilization obtained as follows.

An aqueous resin dispersion is prepared and solubilized under quite the same conditions as actually used for preparing the aqueous dispersed resin composition of the present invention, except for adding no hydrazine derivative (B). The resulting resin dispersion is diluted with water so as to have a nonvolatile content of 15% by weight. The nonvolatile content (W part by weight) of the resulting diluted resin dispersion is measured. The diluted resin dispersion is then centrifuged at centrifugal acceleration of $1.8 \times 10^5$ g for 60 minutes, and the nonvolatile content (w part by weight) in the supernatant liquor is measured. The degree of solubilization (wt %) is calculated from equation:

Degree of Solubilization=$w/W \times 100$ (wt%)

Accordingly, where an alkali and/or an organic solvent is added before or during emulsion polymerization for preparing aqueous resin dispersion (A), and the copolymer resin as produced has a degree of solubilization of 5% by weight or more, the resulting copolymer resin as obtained serves as aqueous resin dispersion (A) without any positive addition of an alkali and/or an organic solvent for solubilization.

The degree of solubilization of the outermost layer or the inner layer can be measured in the same manner as described above by using a polymer separately prepared from a monomer mixture for the outermost layer or the inner layer under the same conditions as used for preparing the resin particles of aqueous resin dispersion (A).

Alkalis which can be used for solubilization include inorganic water-soluble alkalis, e.g., sodium hydroxide and potassium hydroxide; inorganic salts capable of providing an alkaline aqueous solution, e.g., sodium hydrogencarbonate and sodium pyrophosphate; aqueous ammonia; and organic amines. As previously stated, addition of an alkali does not always need to be done after production of the copolymer. In other words, in some cases, a monomer may be neutralized by addition of an alkali and then subjected to copolymerization. The amount of the alkali to be used may be such for either complete or partial neutralization of the carboxyl groups in the copolymer resin.

An organic solvent may be supplementarily used where alkali addition is insufficient for desired water solubilization, or solubilization as desired may be effected only by addition of an organic solvent.

Organic solvents which can be used for solubilization include texanol, ethylene glycol monobutyl ether, ethylene glycol monoethyl ether and their acetate, benzyl alcohol, butyl carbitol acetate, and 2,2,4-trimethyl-1,3-pentanediol.

The aqueous dispersed resin composition according to the present invention comprises aqueous resin dispersion (A) having incorporated thereinto hydrophilic compound (B) comprising a hydrazine derivative having at least two hydrazino group in the molecule thereof.

Hydrophilic compound (B) includes dicarboxylic acid dihydrazides having, for example, from 2 to 10, and preferably from 4 to 6, carbon atoms, such as oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, and itaconic acid dihydrazide; and aliphatic water-soluble dihydrazines having from 2 to 4 carbon atoms, such as ethylene-1,2-dihydrazine, propylene-1,3-dihydrazine, and butylene-1,4-dihydrazine.

Also included in hydrophilic compound (B) are polymers represented by formula:

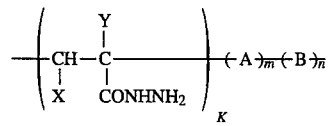

wherein X represents a hydrogen atom or a carboxyl group; Y represents a hydrogen atom or a methyl group; A represents a unit derived from acrylamide, methacrylamide, an acrylic ester, a methacrylic ester or maleic anhydride; B represents a unit derived from a monomer copolymerizable with the monomer of unit A; and k, m, and n each represents a number satisfying formulae:

2 mol %$\leq k \leq$100 mol %

0 mol %$\leq (m+n) \leq$98 mol %

$(k+m+n)$=100 mol %

The details of these polymers are described, e.g., in JP-A-55-6535 (corresponding to U.S. Pat. No. 4,230,525).

The proportion of the hydrazine derivative in the aqueous dispersed resin composition is preferably such that the molar ratio of the hydrazino groups (—NHNH$_2$) in the hydrazine derivative to the total carbonyl groups (>C=O) of the resin of aqueous resin dispersion (A), i.e., (—NHNH$_2$)/(>C=O) molar ratio, falls within a range of from 0.2 to 5.0, and more preferably from 0.5 to 2.0. If the proportion of the hydrazine derivative is too small, crosslinking among polymer molecules tends to be insufficient in order for the aqueous resin dispersion to provide a coating film with sufficient water resistance. Even if the hydrazine derivative is used excessively, no further improvement in water resistance results and, besides, the film tends to become inferior-transparent and brittle, and the crosslinking effects tend to be reduced.

If desired, the aqueous dispersed resin composition of the present invention may contain various additives commonly used in coatings, textile assistants, adhesives, and the like. Examples of such additives include pigments, such as mica, barytes, and titanium oxide; a potassium, sodium or ammonium salt of a condensed phosphoric acid, e.g., hexametaphosphoric acid; a sodium or ammonium salt of polyacrylic acid; general anionic or nonionic surface active agents; thickeners, such as methyl cellulose, ethyl cellulose, propyl cellulose, carboxymethyl cellulose, and polyvinyl alcohol; dispersants, tackifiers, flame retardants, and film-formation assistants.

The present invention will now be illustrated in greater detail with reference to Examples and Comparative Examples. All the parts and percents are given by weight unless otherwise indicated.

EXAMPLE 1

A reactor equipped with a temperature controller, an anchor stirrer, a reflux condenser, a feeder, a thermometer, and an inlet for nitrogen was purged with nitrogen, and the following composition was charged therein.

| | |
|---|---|
| Water | 50 parts |
| Sodium salt of a sulfuric acid half-ester of an ethylene oxide (20 mol) adduct of p-nonyl phenol (hereinafter referred to as anionic emulsifying agent A) (35% aqueous solution) | 2 parts |
| Ethylene oxide (25 mol) adduct of p-nonyl phenol (hereinafter referred to as nonionic emulsifying agent B) (20% aqueous solution) | 2 parts |

Separately, mixtures I, II and III having the following compositions were prepared.

| Mixture I: | |
|---|---|
| Water | 40 parts |
| 35% Aqueous solution of anionic emulsifying agent A | 4 parts |
| 20% Aqueous solution of nonionic emulsifying agent B | 4 parts |
| Methyl methacrylate | 35 parts |
| Butyl acrylate | 32 parts |
| Diacetone acrylamide | 12 parts |
| Acrylic acid | 0.5 part |
| Mixture II: | |
| Water | 10 parts |
| 35% Aqueous solution of anionic emulsifying agent A | 0.8 part |
| 20% Aqueous solution of nonionic emulsifying agent B | 1 part |
| Methyl methacrylate | 8 parts |
| Butyl acrylate | 8 parts |
| Diacetone acrylamide | 3 parts |
| Acrylic acid | 1.5 parts |
| t-Dodecylmercaptan | 0.14 part |
| Mixture III: | |
| Water | 17 parts |
| Potassium persulfate | 0.5 part |

To the reactor was added 10% of mixture I, and the resulting mixture was heated to 90° C. Ten percents of mixture III was fed. Then, the rest of mixture I was added thereto over a period of 2 hours. After one hour from the completion of addition of mixture I, mixture II was slowly fed to the reactor over 1 hour. The rest of mixture III was continuously fed at a constant rate from the start of addition of mixture I to the end of addition of mixture II. After the addition, the reaction mixture was maintained at 90° C. for an additional period of 1.5 hours to complete emulsion polymerization. The resulting aqueous resin dispersion had a nonvolatile content of about 42%.

The aqueous resin dispersion was adjusted to a pH of about 9.0 with aqueous ammonia, and 54 parts of a 10% aqueous solution of adipic acid dihydrazide and 20 parts of butyl cellosolve were added thereto to obtain an aqueous dispersed resin composition. The degree of solubilization of the outermost layer resin was 95%, and that of the inner layer resin was 1.5%.

EXAMPLES 2 TO 6 AND COMPARATIVE EXAMPLES 1 TO 4

An aqueous dispersed resin composition was prepared in the same manner as in Example 1, except for making alterations as shown in Table 1 below. The amounts of water and emulsifying agents in each of mixtures to be fed were distributed in each layer in proportion to the weight of the respective monomer mixture.

TABLE 1

| | Example 1 | Example 2 | Example 3 | Example 4 | Example 5 | Example 6 |
|---|---|---|---|---|---|---|
| Monomer Composition (part): | | | | | | |
| Inner Layer: | | | | | | |
| Diacetone acrylamide | 12 | 5 | — | 7 | 1.7 | 3 |
| Acrylic acid | 0.5 | 0.6 | — | 1.4 | 1.7 | — |
| Methacrylic acid | — | — | 0.3 | — | — | 1.8 |
| Methyl methacrylate | 35 | — | 20 | 41 | 38 | 13.2 |
| Butyl acrylate | 32 | 44 | 27 | 21 | 38 | 24 |
| 2-Ethylhexyl acrylate | — | — | — | — | — | — |
| Styrene | — | 44 | 7 | — | — | 18 |
| 2-Hydroxyethyl acrylate | — | — | 0.3 | — | 3 | — |
| t-Dodecylmercaptan | — | — | 0.1 | — | — | — |

TABLE 1-continued

| Outermost Layer: | | | | | | |
|---|---|---|---|---|---|---|
| Diacetone acrylamide | 3 | — | 7 | 1.5 | 3 | 1.8 |
| Acrolein | — | 0.3 | — | — | — | — |
| Acrylic acid | 1.5 | 0.8 | 1.1 | 1.5 | 1 | 1.2 |
| Methacrylic acid | — | 0.5 | — | — | — | — |
| Methyl methacrylate | 8 | 2.4 | 20 | 5 | 6.7 | 19 |
| Butyl acrylate | 8 | 2.0 | 17 | 20 | 7.0 | 17 |
| Styrene | — | — | — | 2 | — | — |
| 2-Hydroxyethyl acrylate | — | 0.3 | — | — | — | 1 |
| t-Dodecylmercaptan | 0.14 | — | 0.5 | 0.3 | 0.1 | 0.2 |
| Solvent (part) | butyl cellosolve (20) | butyl cellosolve (15) | butyl cellosolve (10) | benzyl alcohol (10) | amyl acetate (12) | butyl cellosolve (15) |
| Hydrazine derivative (part) | ADH* (54) | ADH (72) | SDH** (14) | ADH (44) | ADH (24) | ADH (30) |
| (—NHNH$_2$/> C=O Molar ratio) | (0.7) | (2.4) | (0.3) | (1.0) | (1.0) | (1.0) |

| | Compar. Example 1 | Compar. Example 2 | Compar. Example 3 | Compar. Example 4 |
|---|---|---|---|---|
| Monomer Composition (part): | | | | |
| Inner Layer: | | | | |
| Diacetone acrylamide | 15 | 3 | 12 | 3 |
| Acrylic acid | 0.6 | — | 0.5 | — |
| Methacrylic acid | — | 0.5 | — | 1.8 |
| Methyl methacrylate | 44 | 38 | 35, | 13.2 |
| Butyl acrylate | 40 | — | 32 | 24 |
| 2-Ethylhexyl acrylate | — | 38 | — | — |
| Styrene | — | — | — | 18 |
| 2-Hydroxyethyl acrylate | — | — | — | — |
| t-Dodecylmercaptan | — | — | — | — |
| Outermost Layer: | | | | |
| Diacetone acrylamide | — | 0.8 | 3 | 1.8 |
| Acrolein | — | — | — | — |
| Acrylic acid | — | 0.3 | 1.5 | 1.2 |
| Methacrylic acid | — | — | — | — |
| Methyl methacrylate | — | 9 | 8 | 19 |
| Butyl acrylate | — | 10 | 8 | 17 |
| Styrene | — | — | — | — |
| 2-Hydroxyethyl acrylate | — | — | — | 1 |
| t-Dodecylmercaptan | — | 0.1 | 0.14 | — |
| Solvent (part) | none | butyl cellosolve (15) | butyl cellosolve (20) | butyl cellosolve (15) |
| Hydrazine derivative (part) | ADH (54) | ADH (20) | — | ADH (30) |
| (—NHNH$_2$/> C. = O Molar ratio) | (0.7) | (1.0) | — | (1.0) |

Note:
*A 10% aqueous solution of adipic acid dihydrazide
**A 10% aqueous solution of sebacic acid dihydrazide Each of the aqueous dispersed resin compositions prepared in Examples and Comparative Examples was evaluated according to the following test methods. The results of evaluation are shown in Table 2 below.

1) Water Absorption:

The composition was cast on a glass plate to a dry thickness of about 500 μm and dried at 20° C. for 7 days. The cast film was punched out to obtain a specimen of 5 cm×5 cm. The specimen was immersed in water at 20° C. for 24 hours, and the water absorption (%) of the specimen taken out of water was measured.

2) Resistance to Whitening on Contact with Water:

The same specimen as prepared in 1) above was immersed in water at 20° C. for 7 days, and the degree of whitening of the film was observed with the naked eye.

3) Adhesion to Substrate:

The composition was applied to a calcium silicate plate (a product of Nippon Test Panel Co.; specific gravity: 1.0 g/cm$^3$) or a substrate made of an alkyd resin to a dry thickness of 20 μm and dried at 20° C. for 1 week. The adhesive strength of the film was measured by an adhesive tape test using "Cello-Tape", a product of Nichiban Co., Ltd. The test results were rated according to the following standard.

A . . . No squares was peeled.

B . . . Part of squares were peeled.

C . . . A considerable number of squares were peeled.

4) Surface Smoothness:

The composition was applied to a glass plate and dried, and the surface smoothness of the film formed was evaluated with the naked eye according to the following rating system.

A . . . Excellent

B . . . Slightly inferior

C . . . Inferior

TABLE 2

|  | Example No. |  |  |  |  |  | Comparative Example No. |  |  |  |
|---|---|---|---|---|---|---|---|---|---|---|
|  | 1 | 2 | 3 | 4 | 5 | 6 | 1 | 2 | 3 | 4 |
| Proportion of outermost layer (%) | 21 | 6 | 45 | 30 | 17 | 40 | - | 20 | 21 | 40 |
| Degree of solubilization of resin particles (%): |  |  |  |  |  |  |  |  |  |  |
| Whole | 22 | 5.1 | 10 | 31 | 30 | 11.2 | 1.5 | 1.7 | 22 | 2.8 |
| Outermost layer | 95 | 70 | 20 | 95 | 80 | 25 | — | 2.5 | 95 | 4 |
| Inner layer | 1.5 | 1.0 | 2 | 4 | 20 | 2 | 1.5 | 1.5 | 1.5 | 2 |
| Film Properties: |  |  |  |  |  |  |  |  |  |  |
| Water absorption (%) | 4 | 4 | 10 | 8 | 15 | 8 | 4 | 6 | 25 | 6 |
| Resistance to whitening on contact with water (color of film) | colorless | blue | blue | blue | blue | blue | white | white | white | white |
| Adhesion to substrate: |  |  |  |  |  |  |  |  |  |  |
| Calcium silicate | A | A | A | A | A | A | C | C | A |  |
| Alkyd resin | A | B | A | A | A | A | B | C | B | B |
| Smoothness | A | B | A | A | A | A | C | C | A | B |

As described and demonstrated above, the aqueous dispersed resin composition according to the present invention provides a film excellent in water resistance, adhesion to a substrate, smoothness, gloss, and resistance to whitening on contact with water.

While the invention has been described in detail and with reference to specific examples thereof, it will be apparent to one skilled in the art that various changes and modifications can be made therein without departing from the spirit and scope thereof.

What is claimed is:

1. An aqueous dispersed resin composition comprising (A) an aqueous dispersion of carbonyl-containing resin particles having an inner layer and an outermost layer, which is obtained by emulsion polymerization of a monomer mixture comprising (a) not less than 0.5% by weight of a carbonyl-containing monomer containing at least one aldo group or keto group and one polymerizable unsaturated double bond in the molecule thereof, (b) not less than 0.5% by weight of an ethylenically unsaturated carboxylic acid, (c) not more than 99% by weight of a monomer having a water-solubility of not more than 8 g/100 ml at 20° C., and (d) not more than 99% by weight of an unsaturated monomer other than the monomers (a) to (c) in the presence of dispersed resin particles serving as an inner layer and (B) a hydrophilic hydrazine compound containing at least two hydrazino groups in the molecule thereof, in which the resin constituting said outermost layer of said carbonyl-containing resin particles has a degree of solubilization of at least 5% by weight, and the resin constituting said inner layer has a degree of solubilization lower than that of the resin constituting said outermost layer.

2. An aqueous dispersed resin composition as claimed in claim 1, wherein the resin constituting said outermost layer of said carbonyl-containing resin particles of dispersion (A) has a degree of solubilization of 30% by weight or more.

3. An aqueous dispersed resin composition as claimed in claim 1, wherein the resin constituting said inner layer of said carbonyl-containing resin particles of dispersion (A) has a degree of solubilization of less than 5% by weight.

4. An aqueous dispersed resin composition as claimed in claim 1, wherein said carbonyl-containing resin particles of dispersion (A) has a degree of solubilization of from 6 to 50% by weight as a whole.

5. An aqueous dispersed resin composition as claimed in claim 4, wherein said carbonyl-containing resin particles of dispersion (A) has a degree of solubilization of from 10 to 35% by weight as a whole.

6. An aqueous dispersed resin composition as claimed in claim 1, wherein said outermost layer of said carbonyl-containing resin particles of dispersion (A) is formed by emulsion polymerization of a monomer mixture comprising (a) not less than 0.5% by weight of a carbonyl-containing monomer containing at least one aldo group or keto group and one polymerizable unsaturated double bond in the molecule thereof, (b) from 0.5% to 5% by weight of an ethylenically unsaturated carboxylic acid, (c) from 30 to 99% by weight of a monomer having a water-solubility of not more than 8 g/100 ml at 20° C., and (d) not more than 69% by weight of an unsaturated monomer other than the monomers (a) to (c) in the presence of a chain transfer agent.

7. An aqueous dispersed resin composition as claimed in claim 6, wherein said outermost layer of said carbonyl-containing resin particles of dispersion (A) is formed by emulsion polymerization of a monomer mixture comprising (a) from 2 to 20% by weight of a carbonyl-containing monomer containing at least one aldo group or keto group and one polymerizable unsaturated double bond in the molecule thereof, (b) from 2 to 5% by weight of an ethylenically unsaturated carboxylic acid, (c) from 55 to 96% by weight of a monomer having a water-solubility of not more than 8 g/100 ml at 20° C., and (d) not more than 15% by weight of an unsaturated monomer other than the monomers (a) to (c) in the presence of a chain transfer agent.

8. An aqueous dispersed resin composition as claimed in claim 1, wherein said outermost layer of said carbonyl-containing resin particles of dispersion (A) is formed by emulsion polymerization of a monomer mixture comprising (a) from 2 to 20% by weight of a carbonyl-containing monomer containing at least one aldo group or keto group and one polymerizable unsaturated double bond in the molecule thereof, (b) from 5 to 40% by weight of an ethylenically unsaturated carboxylic acid, (c) from 55 to 93% by weight of a monomer having a water-solubility of not more than 8 g/100 ml at 20° C., and (d) not more than 15% by weight of an unsaturated monomer other than the monomers (a) to (c).

9. An aqueous dispersed resin composition as claimed in claim 8, wherein said emulsion polymerization is carried out in the presence of a chain transfer agent.

10. An aqueous dispersed resin composition as claimed in claim 6, wherein said chain transfer agent is used in an amount of from 0.03 to 5% by weight based on the charged monomer mixture for forming the outermost layer.

11. An aqueous dispersed resin composition as claimed in claim 9, wherein said chain transfer agent is used in an amount of from 0.1 to 2% by weight based on the charged monomer mixture for forming the outermost layer.

12. An aqueous dispersed resin composition as claimed in claim 1, wherein said inner layer of said carbonyl-containing resin particles of dispersion (A) is formed by emulsion polymerization of a monomer mixture comprising (a) not less than 0.5% by weight of a carbonyl-containing monomer containing at least one aldo group or keto group and one polymerizable unsaturated double bond in the molecule thereof, (b) not more than 2% by weight of an ethylenically unsaturated carboxylic acid, (c) not more than 99.5% by weight of a monomer having a water-solubility of not more than 8 g/100 ml at 20° C., and (d) not more than 69% by weight of an unsaturated monomer other than the monomers (a) to (c).

13. An aqueous dispersed resin composition as claimed in claim 12, wherein said inner layer of said carbonyl-containing resin particles of dispersion (A) is formed by emulsion polymerization of a monomer mixture comprising (a) from 1 to 15% by weight of a carbonyl-containing monomer containing at least one aldo group or keto group and one polymerizable unsaturated double bond in the molecule thereof, (b) from 0.5 to 1.8% by weight of an ethylenically unsaturated carboxylic acid, (c) from 83.2 to 98.5% by weight of a monomer having a water-solubility of not more than 8 g/100 ml at 20° C., and (d) not more than 15% by weight of an unsaturated monomer other than the monomers (a) to (c).

14. An aqueous dispersed resin composition as claimed in claim 1, wherein the molar ratio of carbonyl groups in said carbonyl-containing resin particles of dispersion (A) to hydrazino groups in said hydrazine compound is from 0.2 to 5.

15. An aqueous dispersed resin composition as claimed in claim 14, wherein the molar ratio of carbonyl groups in said carbonyl-containing resin particles of dispersion (A) to hydrazino groups in said hydrazine compound is from 0.5 to 2.

\* \* \* \* \*